United States Patent
Zhang et al.

(10) Patent No.: US 9,538,447 B2
(45) Date of Patent: Jan. 3, 2017

(54) METHODS AND APPARATUS FOR DEVICE MONITORING

(75) Inventors: Yi Zhang, Beijing (CN); Lei Du, Beijing (CN); Devaki Chandramouli, Plano, TX (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/416,684

(22) PCT Filed: Jul. 27, 2012

(86) PCT No.: PCT/CN2012/079292
§ 371 (c)(1),
(2), (4) Date: Mar. 27, 2015

(87) PCT Pub. No.: WO2014/015524
PCT Pub. Date: Jan. 30, 2014

(65) Prior Publication Data
US 2015/0264619 A1    Sep. 17, 2015

(51) Int. Cl.
*H04W 36/32* (2009.01)
*H04W 60/04* (2009.01)
(Continued)

(52) U.S. Cl.
CPC ............ *H04W 36/32* (2013.01); *H04W 4/005* (2013.01); *H04W 4/021* (2013.01); *H04W 4/04* (2013.01); *H04W 36/0016* (2013.01); *H04W 60/04* (2013.01); *H04W 64/003* (2013.01); *H04W 8/18* (2013.01)

(58) Field of Classification Search
CPC .. H04W 36/0016; H04W 36/32; H04W 4/005; H04W 4/021; H04W 4/04; H04W 60/04; H04W 64/003; H04W 8/18
See application file for complete search history.

(56) References Cited

U.S. PATENT DOCUMENTS 8,229,473 B1    7/2012  De La Rue
2010/0323698 A1*  12/2010  Rune ................... H04W 48/06
                                                          455/436
(Continued)

FOREIGN PATENT DOCUMENTS

EP       2582171 A1    4/2013
WO   WO 2011/054299 A1  5/2011
(Continued)

OTHER PUBLICATIONS

3GPP TR 23.888 V1.6.1 (Feb. 2012), "3rd Generation Partnership Project; Technical Specification Group Services and System Aspects; System Improvements for Machine-Type Communications (Release 11)", 165 pgs.
(Continued)

*Primary Examiner* — Hirdepal Singh
(74) *Attorney, Agent, or Firm* — Harrington & Smith

(57) ABSTRACT

Systems and techniques for detecting movement of machine type communication devices. An allowed location area is configured for one or more machine type communication devices, and a machine type communication device, upon detecting movement between an area outside its allowed location area and an area inside its allowed location area, notifies a network of the movement.

17 Claims, 6 Drawing Sheets

(51) Int. Cl.
*H04W 64/00* (2009.01)
*H04W 4/00* (2009.01)
*H04W 4/02* (2009.01)
*H04W 4/04* (2009.01)
*H04W 36/00* (2009.01)
*H04W 8/18* (2009.01)

(56) References Cited

U.S. PATENT DOCUMENTS

| | | | | |
|---|---|---|---|---|
| 2012/0178444 A1* | 7/2012 | Wang | H04W 48/12 | |
| | | | 455/434 | |
| 2012/0244903 A1* | 9/2012 | Fong | H04W 8/20 | |
| | | | 455/517 | |
| 2012/0252397 A1* | 10/2012 | Kumar | 455/404.1 | |
| 2012/0264451 A1* | 10/2012 | Kim et al. | 455/456.1 | |
| 2013/0053033 A1* | 2/2013 | Jokinen | H04W 36/0061 | |
| | | | 455/436 | |
| 2013/0150039 A1* | 6/2013 | Ramle et al. | 455/436 | |
| 2013/0324157 A1* | 12/2013 | Park | H04W 60/00 | |
| | | | 455/456.1 | |
| 2015/0131437 A1* | 5/2015 | Kim | H04W 28/0289 | |
| | | | 370/230 | |
| 2015/0195753 A1* | 7/2015 | Jung et al. | 370/331 | |

FOREIGN PATENT DOCUMENTS

| WO | WO 2011/084011 A2 | 7/2011 |
|---|---|---|
| WO | WO 2011/087290 A2 | 7/2011 |
| WO | WO-2011157055 A1 | 12/2011 |
| WO | WO-2012/051890 A1 | 4/2012 |

OTHER PUBLICATIONS

3GPP TS 22.368 V10.4.0 (Mar. 2011), "3$^{rd}$ Generation Partnership Project; Technical Specification Group Services and System Aspects; Service requirements for Machine-Type Communications (MTC); Stage 1 (Release 10)", 17 pgs.

\* cited by examiner

METHODS AND APPARATUS FOR DEVICE MONITORING

TECHNICAL FIELD

The present invention relates generally to telecommunications. More particularly, the invention relates to systems and techniques for status monitoring for machine type communication (MTC) devices.

BACKGROUND

Machine type communication (MTC) devices are user devices, also referred to as user equipments (UEs) that may be distributed through areas served by cellular wireless networks. MTC devices typically operate without human intervention and perform communications that are typically infrequent and short in duration. For example, MTC devices may collect seismic data and may relay this data to a collection station after an earthquake, remaining idle except during data collection times. MTC devices are often characterized by short duration of data transmission, low volume of data transmission, lower power consumption, and low mobility. MTC devices may be deployed in areas in which a relatively high likelihood of vandalism or theft is present. MTC devices may be designed to operate for long periods without human intervention, so it is desirable for a communications network to have a mechanism for detecting failures or changes in behavior for a machine type communication device. It is desirable to monitor MTC devices for events such as:

behavior contrary to that associated with activated MTC features
change in association between the device and the UICC
communication failure events and reasons
loss of connectivity for more than a specified time
change of location of the device, such as geographical position or point of attachment to the network

SUMMARY

In an embodiment of the invention, a method comprises detecting movement of a user device between an area inside an allowed location area and an area outside an allowed location area, wherein the allowed location area is smaller than a tracking area associated with the user device, and wherein the allowed location area is defined for the user device and reporting the movement of the user device to a network.

In another embodiment of the invention, a method comprises configuring an allowed location area for at least one user device on user equipment and receiving a notification from the user equipment upon movement of the user device between an area inside the allowed location area and an area outside the allowed location area.

In another embodiment of the invention, an apparatus comprises at least one processor and memory storing computer program code. The memory storing the computer program code is configured to, with the at least one processor, cause the apparatus to at least detect movement of a user device between an area inside an allowed location area and an area outside an allowed location area, wherein the allowed location area is smaller than a tracking area associated with the user device, and wherein the allowed location area is defined for the user device. The memory storing the computer program code is further configured to, with the at least on processor, cause the apparatus to report the movement of the user device to a network.

In another embodiment of the invention, an apparatus comprises at least one processor and memory storing computer program code. The memory storing the computer program code is configured to, with the at least one processor, cause the apparatus to at least configure an allowed location area for at least one user device and receive a notification from the user equipment upon movement of the user device between an area inside the allowed location area and an area outside the allowed location area.

In another embodiment of the invention, a computer readable medium stores a program of instructions, execution of which by a processor configures an apparatus to at least detect movement of a user device between an area inside an allowed location area and an area outside an location area, wherein the allowed location area is smaller than a tracking area associated with the user device, and wherein the allowed location area is defined for the user device. The execution of the computer program code by a processor further configures the apparatus to report the movement of the user device to a network.

In another embodiment of the invention, A computer readable medium stores a program of instructions, execution of which by a processor configures an apparatus to at least configure an allowed location area for at least one user device and receive a notification from the user equipment upon movement of the user device between an area inside the allowed location area and an area outside the allowed location area.

In one embodiment, the allowed location area is configured by signaling to a base station. In one embodiment, the signaling is performed by a home subscriber server. In one embodiment, the signaling is performed by one of a mobility management entity and an SGSN. In one embodiment, the signaling is performed by a base station. In one embodiment, the base station is an eNodeB. In one embodiment, the base station is a radio network controller. In one embodiment, the movement of the user equipment is reported by the user equipment by signaling to a network. In one embodiment, the movement of the user equipment is reported by a radio access network by signaling to the core network. In one embodiment, the radio access network comprises an eNodeB. In one embodiment, the radio access network comprises a radio network controller. In one embodiment, reporting the movement of the user device to the network comprises starting a timer upon movement from outside to inside the allowed location area and reporting movement only if the device does not move back inside the allowed location area before timer expiration. In one embodiment, the timer is terminated and reset if the device moves back outside the allowed location area before the timer expires.

In one embodiment, reporting the handover to the network comprises starting a timer upon handover from a cell on the list of allowed cells to a cell not on the list of allowed cells and reporting movement only if a handover back to a cell on the list of allowed cells does not occur before the timer expires. In one embodiment, the timer is terminated and reset if a handover back to a cell on the list of allowed cells occurs before the timer expires. In one embodiment, reporting the handover to the network comprises starting a timer upon handover from a cell on the list of allowed cells to a cell not on the list of allowed cells and reporting movement only if a handover back to a cell on the list of allowed cells does not occur before the timer expires. In one embodiment, the timer is terminated and reset if a handover back to a cell on the list of allowed cells occurs before the timer expires.

In one embodiment, the at least one user device is a user device on a radio access network. In one embodiment, receiving the notification comprises receiving a notification from the radio access network. In one embodiment, the notification is received through signaling. In one embodiment, the signaling is received from the user device. In one embodiment, the signaling is received from a base station. In one embodiment, the base station is an eNodeB. In one embodiment, the signaling is received from a radio access network.

DETAILED DESCRIPTION

Embodiments of the present invention recognize that one significant event that may interfere with the operation of an MTC device is movement of the device, and that movement of a device can be detected by a change in the point of attachment. In one approach, the SGSN (serving global packet ratio service (GPRS) support node) or MME (mobility management entity) (SGSN/MME) checks whether there is a change in the point of attachment by comparing the location area information from the radio access network against configured location area information from the home location register/home subscriber server (HLR/HSS). Such configured information may be, for example, the allowed location area information. If a change has occurred, the SGSN/MME triggers reporting. In another approach, the SGSN/MME reports the UE location, such as the RAI, TAI, CGI, E-CGI, and other information indicating the location, to the HLR/HSS during a mobility management procedure. The HLR/HSS checks whether the UE location is allowed by comparing the location to the configured location, and if the location is not allowed, the HLR/HSS configures the reporting.

Figure 1:
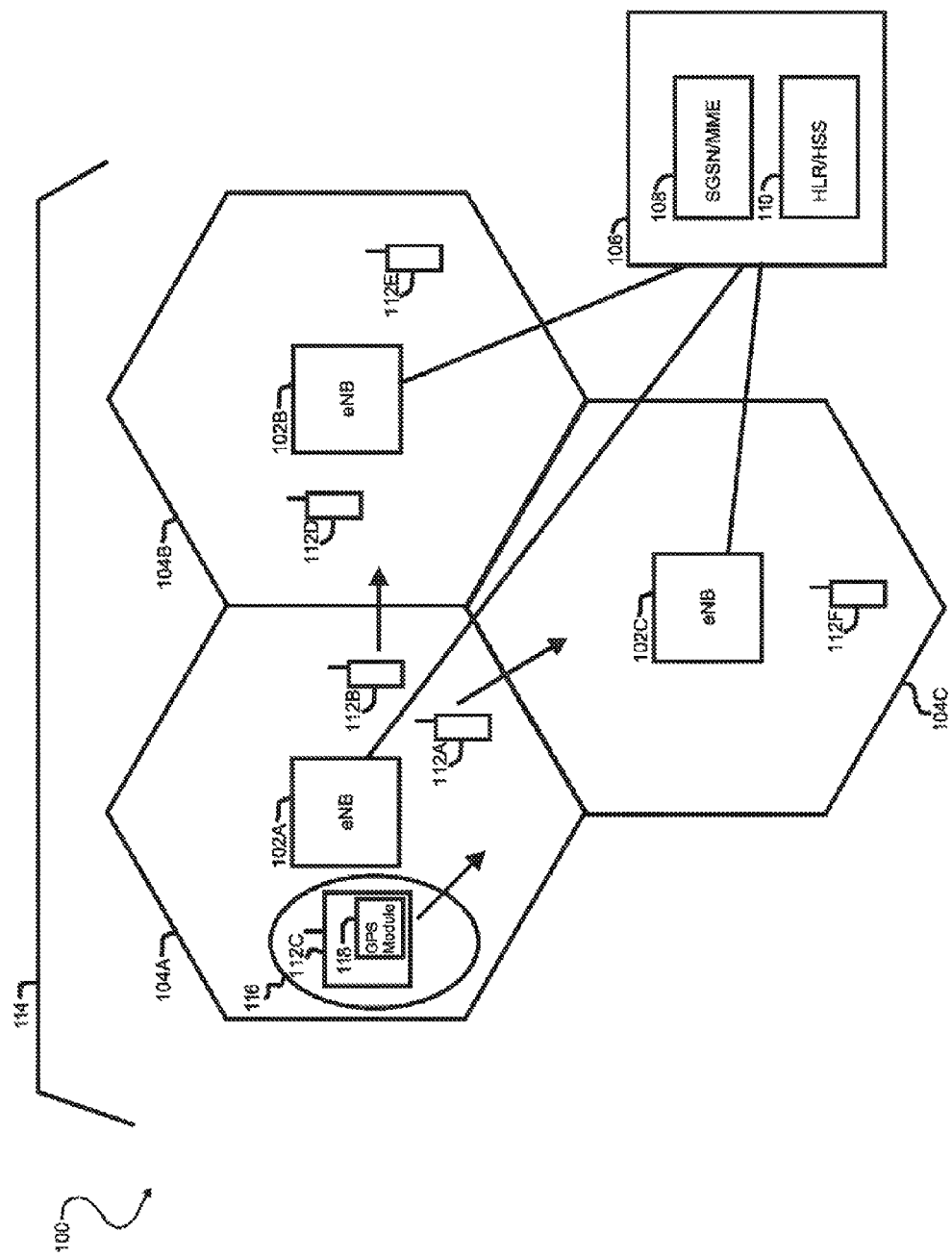
FIG. 1 illustrates a network according to an embodiment of the present invention.

FIG. 1 illustrates a network 100 according to an embodiment of the present invention. The network 100 comprises first and second base stations, implemented as eNodeBs (eNBs) 102A-102C, serving cells 104A-104C, respectively. The eNBs 102A-102C communicate with a core network 106, comprising an SGSN/MME 108 communicating with an HLR/HSS 110. The eNBs 102A-102C support UEs 112A-112F, which may suitably be MTC UEs. Only MTC UEs are illustrated here, but it will be recognized that MTC UEs will typically share network services with large numbers of other types of devices.

The present invention recognizes that of the "point of attachment" refers to tracking area, then the granularity of monitoring involves monitoring a change from one tracking area to another. Tracking area update procedures that detect a change from one tracking area to another, of the sort described above, provide suitable information on change in point of attachment.

However, embodiments of the invention recognize that in many cases, it is desirable to restrict the point of attachment, or allowed location, to an area smaller than a tracking area, such as to a single cell or a group of cells, or an area encompassed within a single cell but smaller than the single cell, or an area encompassed within a group of cells but smaller than the group of cells. If an MTC device moves out of the allowed location area but is still within the tracking area, the movement cannot be detected by the tracking area update procedure. Embodiments of the invention therefore provide for mechanisms for detection of movement between areas that are within a tracking area. For example, if the cells 104A and 104B encompass a tracking area 114 and the allowed location for the UE 112A is the tracking area 114, a tracking area update procedure will be triggered if the UE 112A moves outside the tracking area 114—for example, to the cell 104C. However, suppose that an allowed location area for the UE 112B encompasses only the cell 104A. Movement of the UE 112B outside its allowed location area to another location but within the same tracking area will not trigger a tracking area update. For example, movement of the UE 112B from the cell 102A to 102B will not trigger a tracking area update.

Suppose further that an allowed location area for the UE 112C comprises an area 116 that lies within the cell 104A but does not encompass the entire cell. Such movement might be detected, for example, if the UE 112C is configured to determine its location using a global positioning system (GPS) module 118, or to determine its location through other means, such as triangulation.

According to one or more embodiments of the invention, therefore, a network configures a specific allowed location area for an MTC device, such as one or more of the UEs 112A-112F. Configuration may be performed, for example, by the SGSN/MME 108. The allowed location area may be, for example, a specific cell or group of cells, and configuration information may be provided to one or more eNBs, to the affected devices, or both. Information may be provided to the MTC device by non-access stratum (NAS) or access stratum (AS) messages. In addition, the MTC device may be configured to implement a timer. The timer may be started when the MTC device recognizes that it has moved from inside its allowed location area to outside the allowed location area, or from inside the allowed location area to outside the allowed location area. Expiration of the timer while the MTC device is still outside its allowed location area after moving from inside, or still inside its allowed location area after moving from outside, would trigger reporting. The reporting may be also provided by non-access stratum (NAS) or access stratum (AS) messages. Use of the timer in this way helps to insure that movement back and forth over the boundary of the allowed location area does not cause false reporting.

In one or more embodiments of the invention, for handover of MTC device operating in connected mode to a cell outside of the allowed area, a serving eNB may receive from the MTC device or from other sources, or have previously stored, information defining the allowed location area. For a handover, then, the eNB would select the handover cell only from the allowed location area, even if the handover cell is not the strongest cell. If no cell providing acceptable service lies within the location area, the handover may be rejected. Alternatively, the eNB may handover without considering the allowed location area, or may perform a handover to a cell outside the allowed location area only if no cell within the allowed location area is available, but may report the departure of the MTC device from the allowed location area to the network, such as by reporting to the mobility management entity.

In one or more embodiments of the invention, movement of a connected or idle MTC device with respect to an allowed location area, such as into or out of the allowed location area, is reported, for example to a home subscriber server. Such movement may be reported, for example, by an MTC, a radio network controller (RNC), a base station such an eNB, or a radio access network. Reporting may be of movement between an area outside of an allowed location area and an area inside an area inside of an allowed location area—that is, movement into the allowed location area or outside of the allowed location area may be detected and reported.

Figure 2:
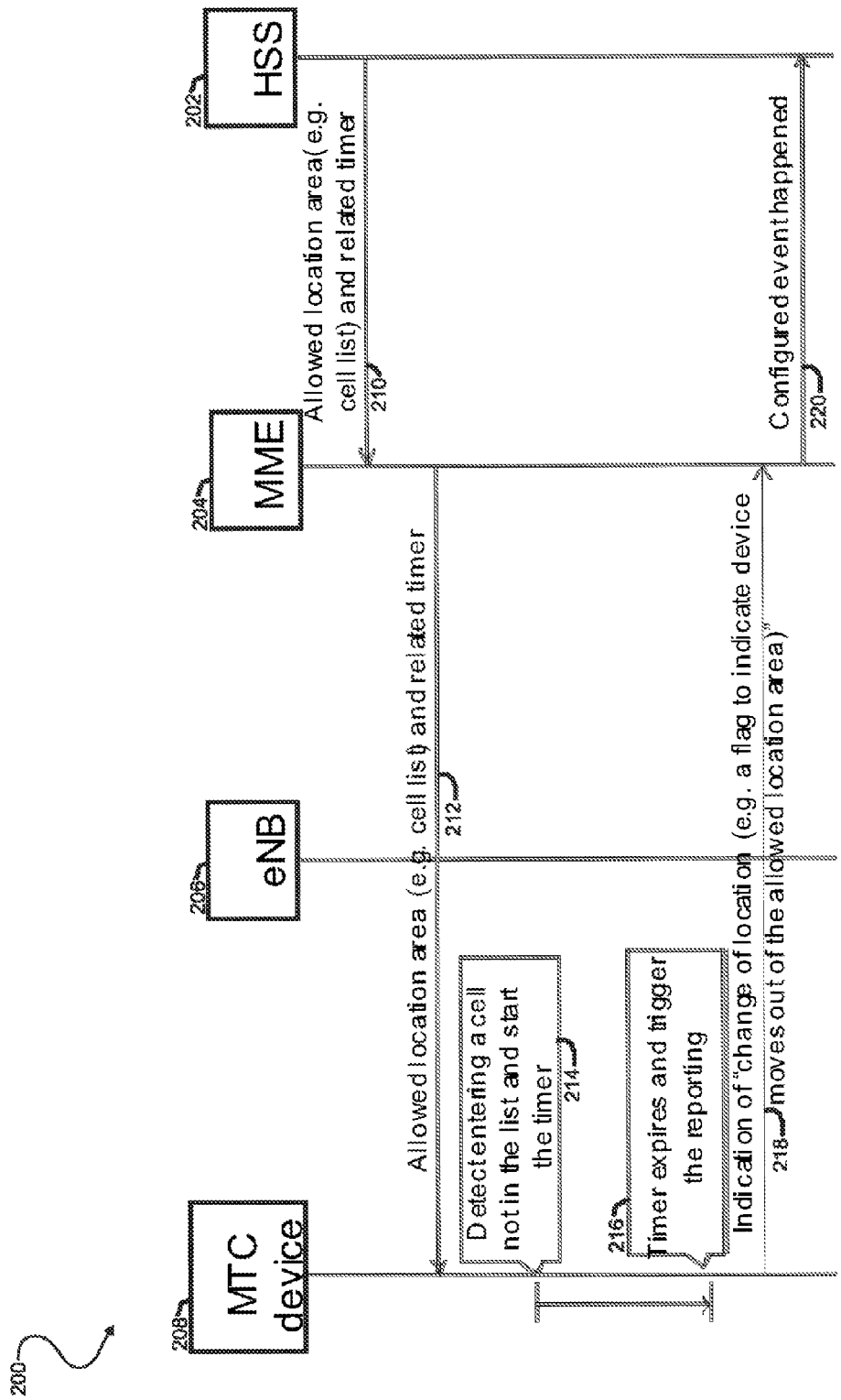
FIGS. 2 and 3 illustrate signaling and processes according to embodiments of the present invention.

FIG. 2 illustrates a diagram 200 showing events and signaling involving a home subscriber server (HSS) 202, a mobility management entity (MME) 204, an eNB 206, and an MTC device 208. The HSS 202 sends a signal 210 to the MME defining an allowed location area, and an associated timer. The allowed location area may be, for example, a list of allowed cells, a list of allowed remote radio heads, a list of allowed antenna units or ports, a list of specified geographic locations, or any combination of these. It will be recognized that a "list" may have only one member if desired.

The MME 204 sends a signal 212 conveying this information to the MTC device. If the MTC device moves out of the allowed area, the device performs an operation 214 of detecting entering a cell that is not within the allowed location area and starting the timer. Upon expiration of the timer, the MTC device performs an operation 216 of report triggering, and sends a signal 218 indicating a location change. The signal 218 is conveyed to the MME 204, which then conveys a signal 220 to the HSS 202, indicating the occurrence of the configured event.

Figure 3:
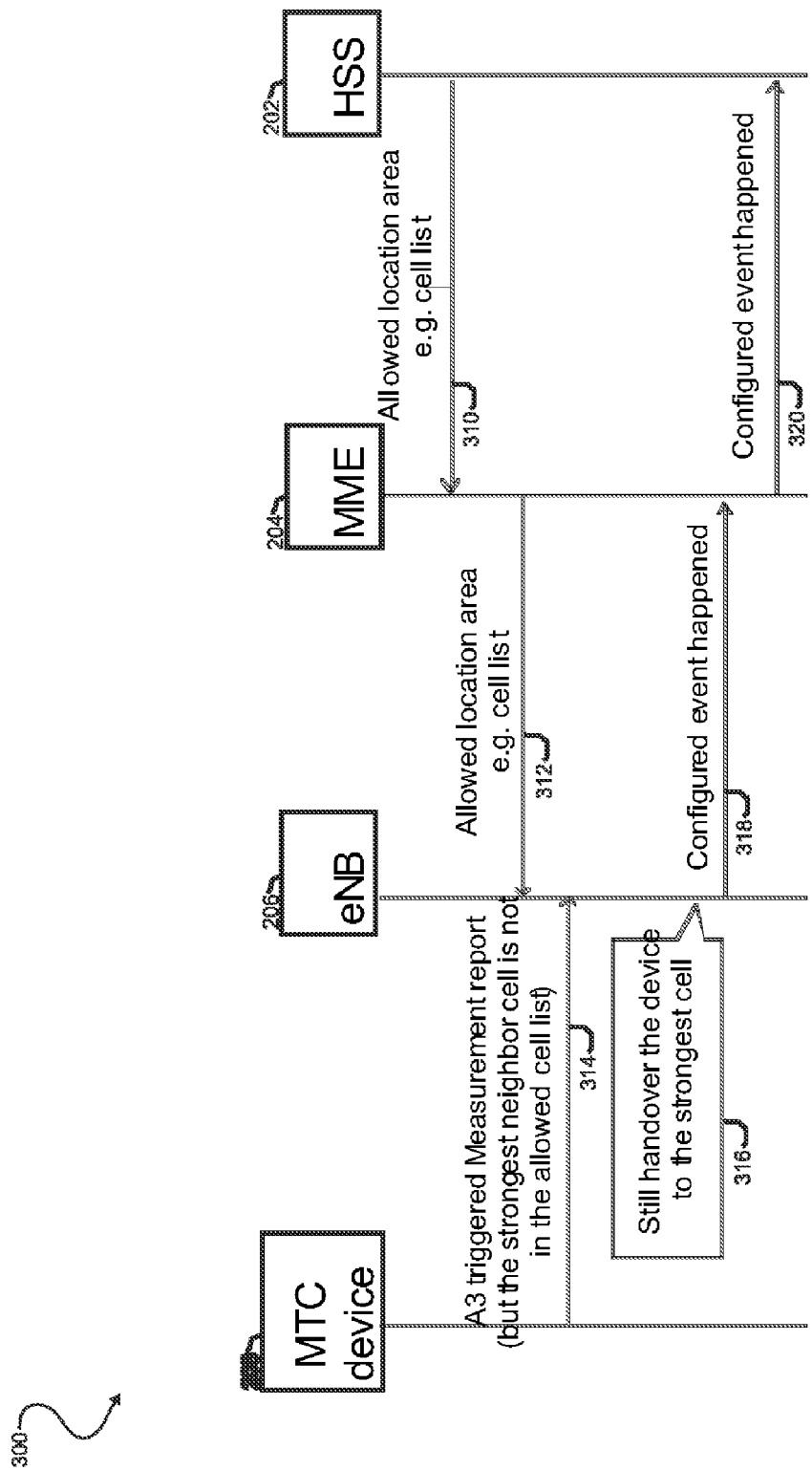

In one or more embodiments of the invention, reporting is performed by the radio access network. FIG. 3 illustrates a diagram 300 showing events and signaling involving the HSS 202, MME 204, eNB 206, and MTC device 208. The HSS 202 sends a signal 310 to the MME defining an allowed location area, and this information is conveyed to the radio access network 206 in a signal 312. Upon an attempted handover when the MTC device 208 is in connected mode, a measurement report, such as an A3 triggered measurement report 314, identifies a handover cell to the eNB 206, with the handover cell being absent from the allowed cell list. In one or more embodiments of the invention, handover is not performed. Thus, no reporting is performed, but in other embodiments of the invention, a handover 316 to the strongest cell or another suitable cell absent from the allowed location area is performed. A signal 318 from the eNB 206 to the MME 204 reports the event, and a signal 320 from the MME 204 reports the event to the HSS.

Figure 4:
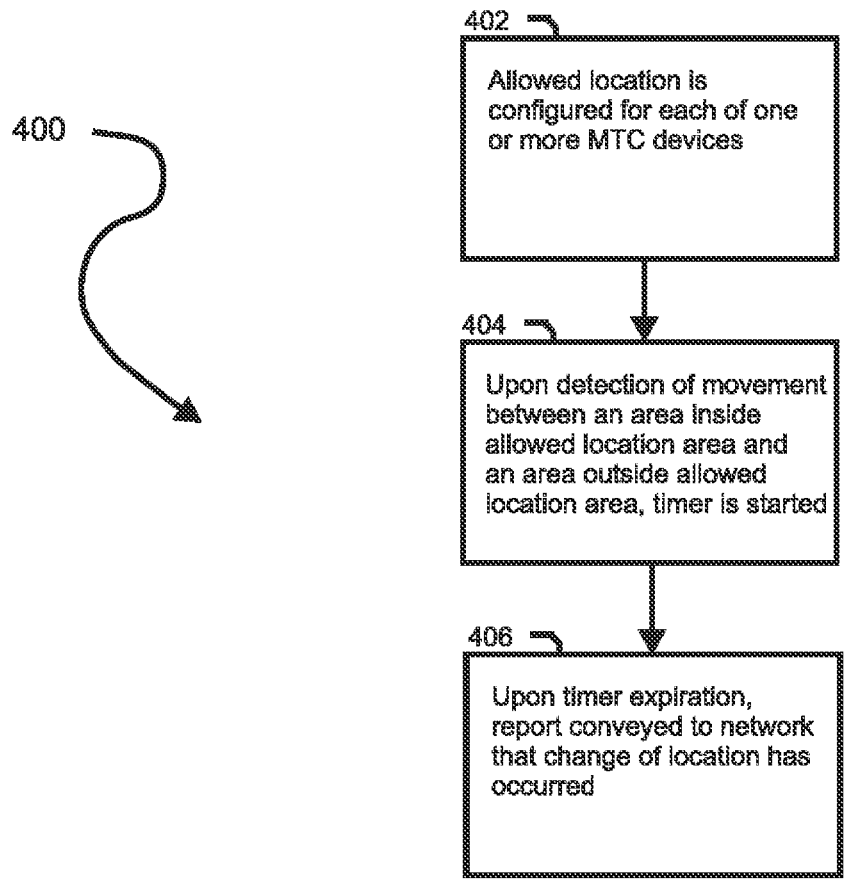
FIGS. 4 and 5 illustrate processes according to embodiments of the present invention.

FIG. 4 illustrates a process 400 of location change detection and reporting according to an embodiment of the present invention. At step 402, an allowed location for each of one or more MTC devices is configured through communication with the MTCs, network eNBs, or both, with the allowed location information suitably comprising a list of allowed cells. At step 404, upon detection of exit from an allowed location or entry into an allowed location area from outside the allowed location area, a timer is started. At step 406, upon expiration of the timer, a report is conveyed, suitably to an HSS, that a change of location has occurred.

Figure 5:
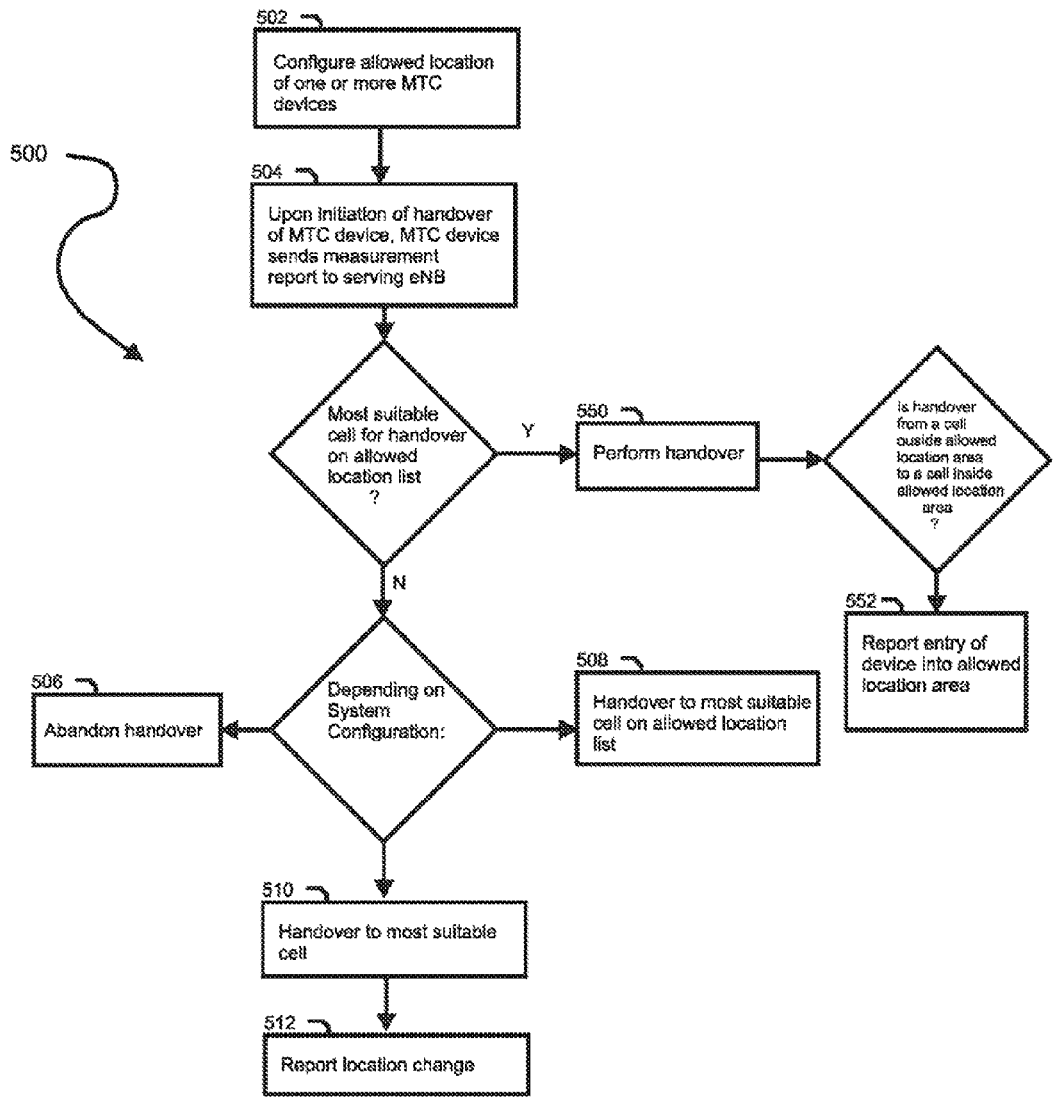

FIG. 5 illustrates a process of location change detection and reporting in which reporting is carried out by a radio access network for an MTC device in connected mode. At step 502, an allowed location for one or more MTC devices is configured. At step 504, upon initiation of a handover of an MTC device, the MTC device sends a measurement report, such as an A3 measurement report, to its serving eNB. If the most suitable cell for handover is on the allowed location list, the process proceeds to step 550 and the handover is performed. If the handover represents movement from a cell outside the allowed location area to a cell inside the allowed location area, the eNB reports a location change to the MME, which conveys the location change information to the HSS.

If the most suitable cell for handover is not on the allowed location list, one of a number of different actions may be taken depending on system configuration. For example, the process may proceed to step 506 and the handover may be abandoned. In a different system configuration, the process proceeds to step 508, and the handover may be performed to a suitable cell on the handover list, and abandoned if no suitable cell appears on the list. In a different system configuration, the process proceeds to step 510, and the handover may be performed to the most suitable cell. Step 510 is only reached if the most suitable cell is not on the allowed location list, so that the handover represents a transition out of the allowed location. The process therefore proceeds to step 512 and the eNB reports a location change to the MME, which conveys the location change to the HSS.

Figure 6:
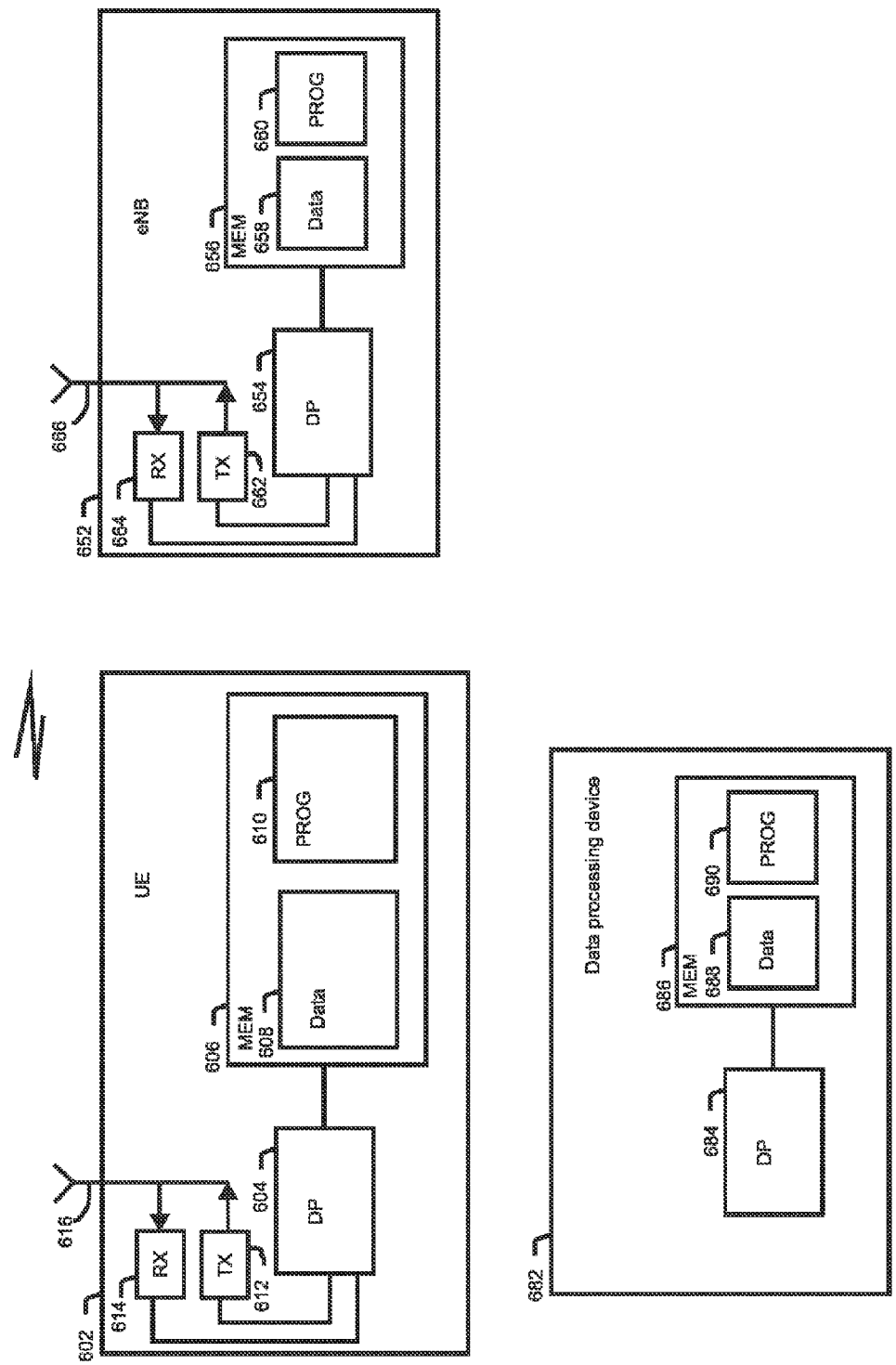
FIG. 6 illustrates elements according to embodiment of the present invention.

Reference is now made to FIG. 6 for illustrating a simplified block diagram of a base station, such an eNB 600 and a user device, such as a UE 652, suitable for use in practicing the exemplary embodiments of this invention. In FIG. 6 an apparatus, such as the eNB 600, is adapted for communication with other apparatuses having wireless communication capability, such as the UE 652. A data processing apparatus, such as the data processing device 680, is adapted to provide data processing services to elements such as the eNB 600.

The eNB 600 includes processing means such as at least one data processor (DP) 604, storing means such as at least one computer-readable memory (MEM) 606 storing data 608 and at least one computer program (PROG) 610 or other set of executable instructions, communicating means such as a transmitter TX 612 and a receiver RX 614 for bidirectional wireless communications with the UE 602 via one or more antennas 616.

The UE 652 includes processing means such as at least one data processor (DP) 654, storing means such as at least one computer-readable memory (MEM) 656 storing data 658 and at least one computer program (PROG) 660 or other set of executable instructions, communicating means such as a transmitter TX 662 and a receiver RX 664 for bidirectional wireless communications with the eNB 600 via one or more antennas 666.

The data processing device 682 includes processing means such as at least one data processor (DP) 684, storing means such as at least one computer-readable memory (MEM) 686 storing data 688 and at least one computer program (PROG) 680 or other set of executable instructions.

At least one of the PROGs 610 in the eNB 600 is assumed to include a set of program instructions that, when executed by the associated DP 604, enable the device to operate in accordance with the exemplary embodiments of this invention, as detailed above. In these regards the exemplary embodiments of this invention may be implemented at least in part by computer software stored on the MEM 606, which is executable by the DP 604 of the eNB 600, or by hardware, or by a combination of tangibly stored software and hardware (and tangibly stored firmware). Similarly, at least one of the PROGs 660 in the UE 652 is assumed to include a set of program instructions that, when executed by the associated DP 654, enable the device to operate in accordance with the exemplary embodiments of this invention, as detailed above. In these regards the exemplary embodiments of this invention may be implemented at least in part by computer software stored on the MEM 656, which is executable by the DP 654 of the UE 652, or by hardware, or by a combination of tangibly stored software and hardware (and tangibly stored firmware). Similarly, at least one of the PROGs 690 in the UE 682 is assumed to include a set of program instructions that, when executed by the associated DP 684, enable the device to operate in accordance with the exemplary embodiments of this invention, as detailed above. In these regards the exemplary embodiments of this invention may be implemented at least in part by computer software stored on the MEM 686, which is executable by the DP 684 of the data processing device 682, or by hardware, or by a combination of tangibly stored software and hardware (and tangibly stored firmware). Electronic devices implementing these aspects of the invention need not be the entire devices as depicted at FIG. 1 or FIG. 6 or may be one or more components of same such as the above described tangibly stored software, hardware, firmware and DP, or a system on a chip SOC or an application specific integrated circuit ASIC.

In general, the various embodiments of the UE 652 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEM 606, 656, and 686 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 604, 654, and 684 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof. For example, the above description has been directed primarily to 3GPP Long term Evolution (LTE) networks, but it will be recognized that one or more embodiments of the invention may also be adapted to universal mobile telecommunications service (UMTS).

We claim:

1. A method comprising:
   determining, by a user device, movement of the user device between an area inside an allowed location area and an area outside the allowed location area, wherein the allowed location area is smaller than a tracking area associated with the user device, and wherein the allowed location area is defined for the user device; and
   based on the determining, reporting by the user device to a network, an indication of the movement of the user device between the area inside the allowed location area and the area outside the allowed location area, wherein reporting the indication of the movement of the user device to the network comprises starting a timer upon movement from inside to outside the allowed location area and reporting movement only if the user device does not move back inside the allowed location area before timer expiration.

2. The method of claim 1, wherein at least one allowed location area comprises at least one of an allowed cell, an allowed remote radio unit, an allowed antenna unit, an allowed antenna port, and an allowed geographic location.

3. The method of claim 1, wherein the user device is a machine type communication device.

4. The method of claim 1, wherein the allowed location area is configured by signaling from the network to the user device.

5. The method of claim 1, wherein the timer is terminated and reset if the device moves back inside the allowed location area before the timer expires.

6. The method of claim 1, wherein the determined movement of the user device between an area inside the allowed location area and an area outside the allowed location area comprises handover of the user device to one of a cell outside the allowed location area and a cell inside the allowed location area.

7. The method of claim 6, wherein handover to a cell outside the allowed location area is performed if the most suitable cell for handover is absent from the list of allowed locations.

8. The method of claim 6, wherein handover to a cell outside the allowed location area is performed if no cell suitable for handover is present in the list of allowed locations.

9. An apparatus comprising:
   at least one processor;
   memory storing computer program code;
   wherein the memory storing the computer program code is configured to, with the at least one processor, cause a user device to at least:
   determine movement of the user device between an area inside an allowed location area and an area outside the allowed location area, wherein the allowed location area is smaller than a tracking area associated with the user device, and wherein the allowed location area is defined for the user device; and
   based on the determining, report to a network, an indication of the movement of the user device between the area inside the allowed location area and the area outside the allowed location area, wherein reporting the indication of the movement of the user device to the network comprises starting a timer upon movement from inside to outside the allowed location area and reporting movement only if the user device does not move back inside the allowed location area before timer expiration.

10. The apparatus of claim 9, wherein at least one allowed location area comprises at least one of an allowed cell, an allowed remote radio unit, an allowed antenna unit, an allowed antenna port, and an allowed geographic location.

11. The apparatus of claim 9, wherein the user device is a machine type communication device.

12. The apparatus of claim 9, wherein the allowed location area is configured by signaling from the network to the user device.

13. The apparatus of claim 9, wherein the timer is terminated and reset if the device moves back inside the allowed location area before the timer expires.

14. The apparatus of claim 9, wherein the determined movement of the user device between an area inside the allowed location area and an area outside the allowed location area comprises handover of the user device to one of a cell outside the allowed location area and a cell inside the allowed location area.

15. The apparatus of claim 14, wherein handover to a cell outside the allowed location area is performed if the most suitable cell for handover is absent from the list of allowed locations.

16. The apparatus of claim 14, wherein handover to a cell outside the allowed location area is performed if no cell suitable for handover is present in the list of allowed locations.

17. An apparatus comprising:

at least one processor;

memory storing computer program code;

wherein the memory storing the computer program code is configured to, with the at least one processor, cause a base station to at least:

configure an allowed location area for a user device;

configure a timer for the user device, wherein the configuring comprises the timer is started upon movement of the user device from inside to outside the allowed location area; and receive, from the user device, a notification of a movement of the user device between an area inside the allowed location area and an area outside the allowed location area, wherein the notification is in response to the user device not having moved back inside the allowed location area before the timer has expired.

* * * * *